March 4, 1930.　　　　J. M. BROWN　　　　1,749,560

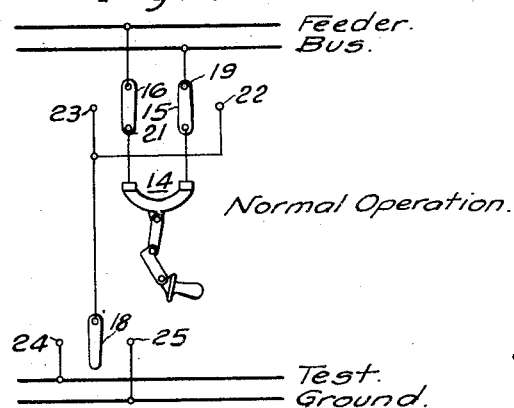
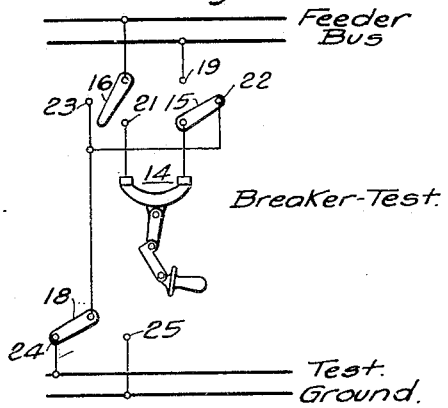
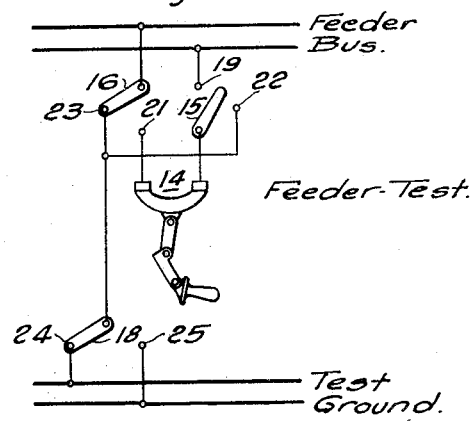
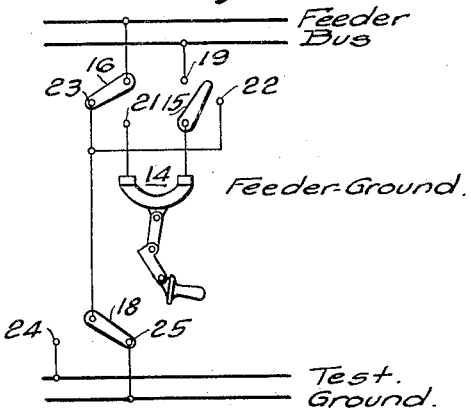
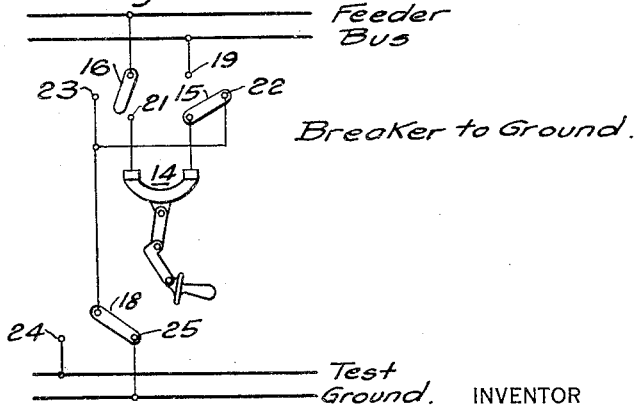

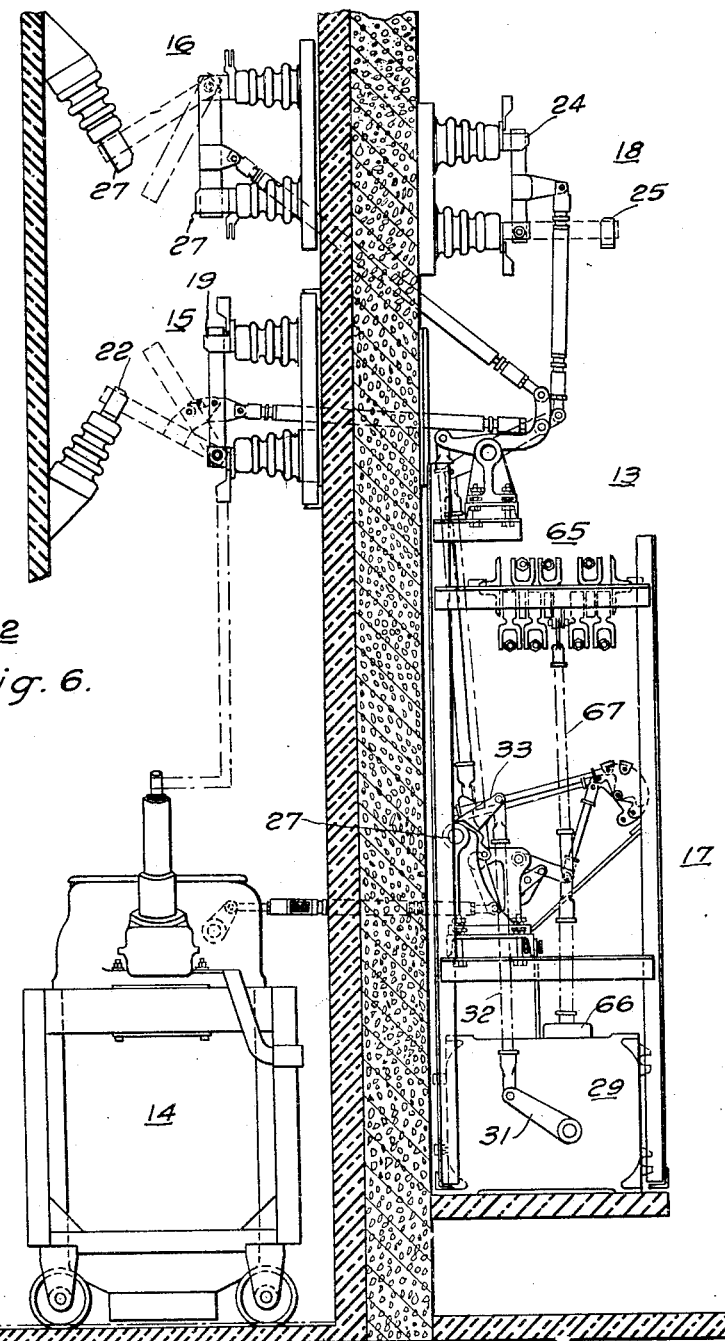

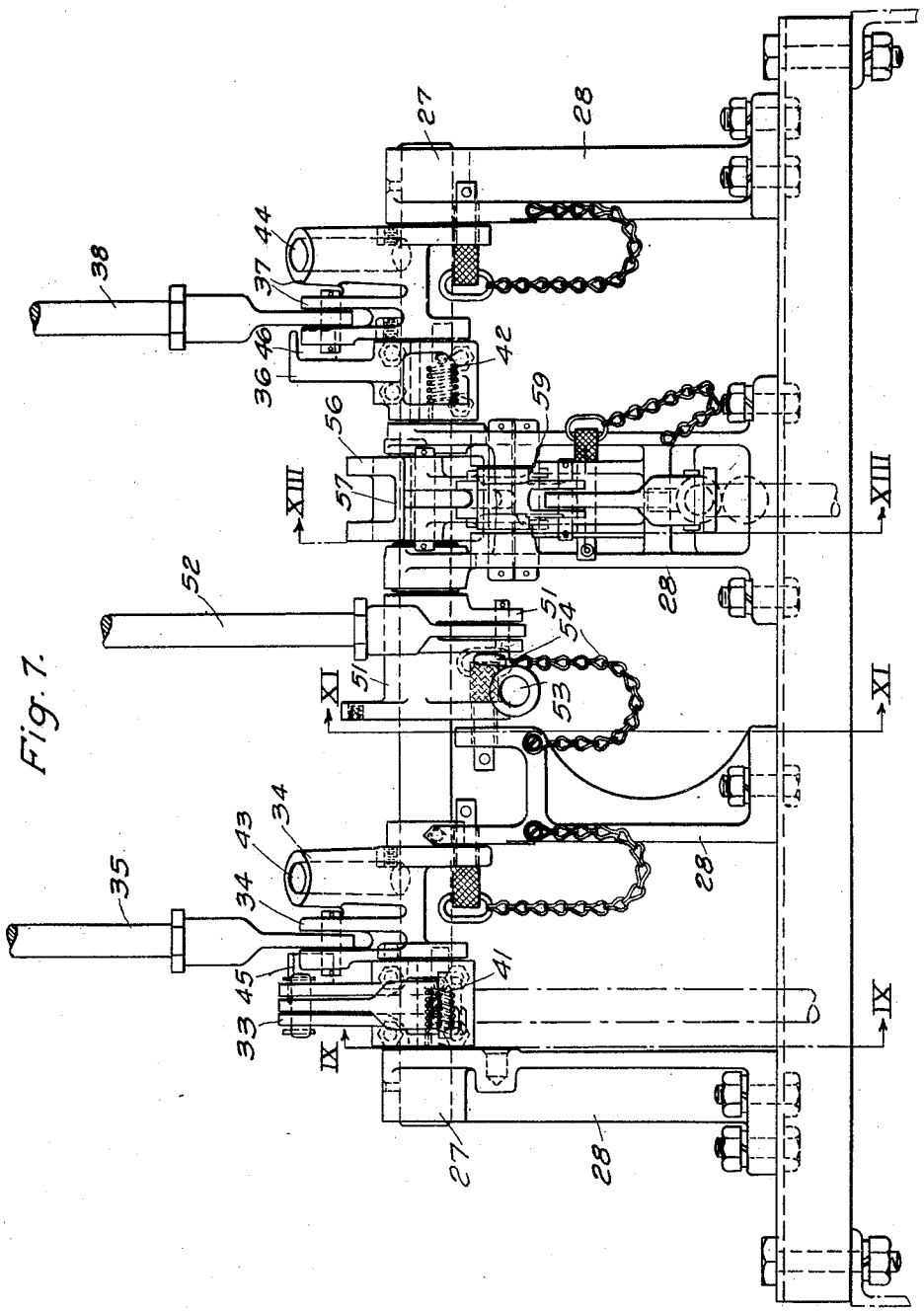

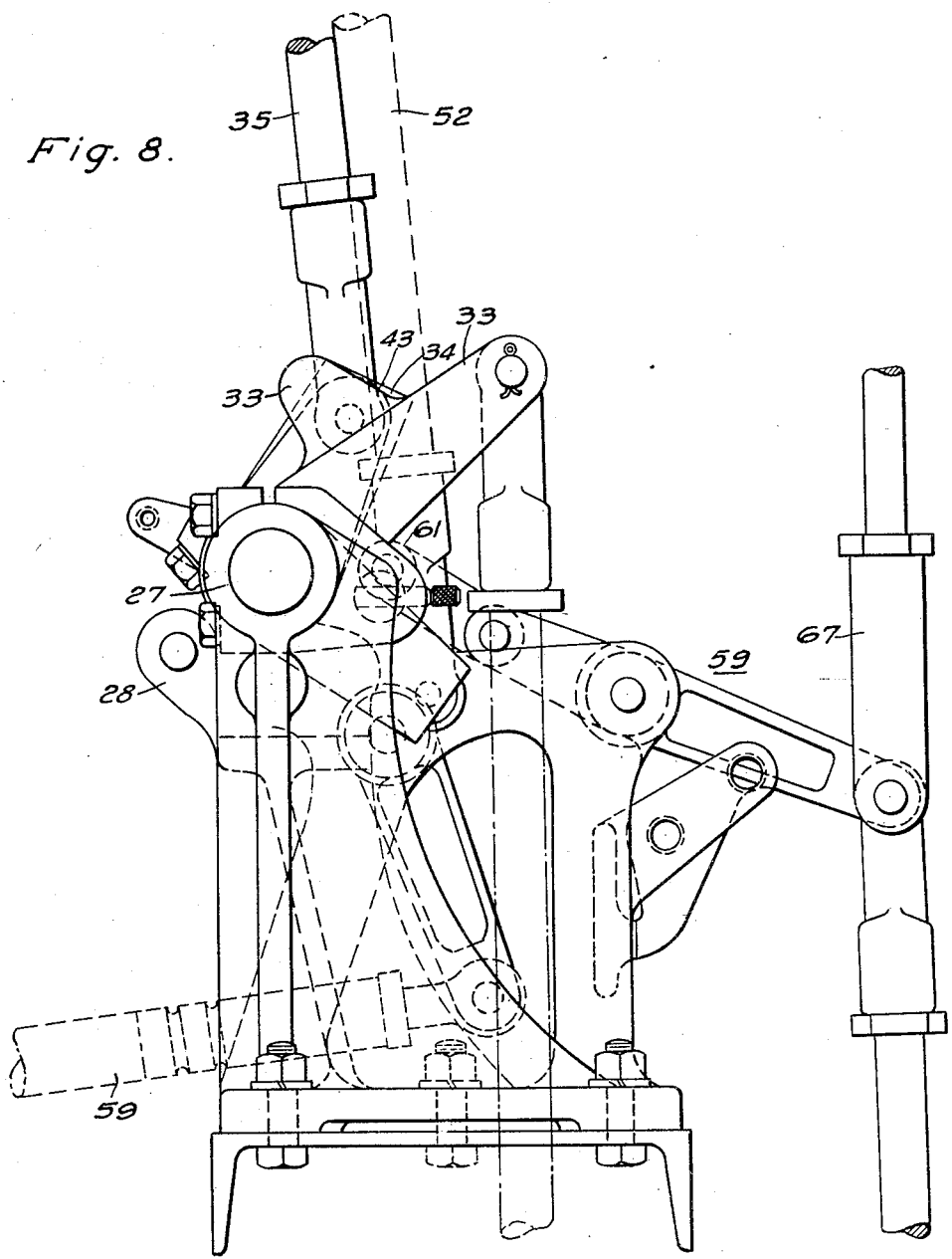

SWITCH MECHANISM

Filed April 11, 1927　　　6 Sheets-Sheet 5

WITNESSES:
E. A. McCloskey

INVENTOR
James M. Brown, deceased,
By Jane D. Brown, Administratrix.
BY
Wesley L. Carr
ATTORNEY

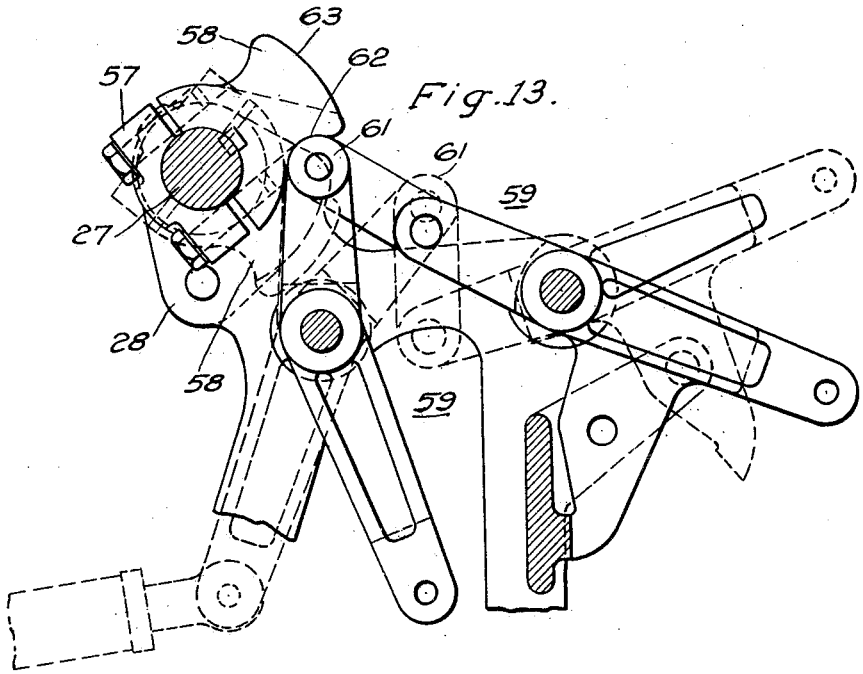

Patented Mar. 4, 1930

1,749,560

UNITED STATES PATENT OFFICE

JAMES M. BROWN, DECEASED, LATE OF PITTSBURGH, PENNSYLVANIA, BY JANE D. BROWN, ADMINISTRATRIX, OF PITTSBURGH, PENNSYLVANIA, ASSIGNOR TO WESTINGHOUSE ELECTRIC & MANUFACTURING COMPANY, A CORPORATION OF PENNSYLVANIA

SWITCH MECHANISM

Application filed April 11, 1927. Serial No. 182,677.

The invention relates to switch mechanism and particularly to switch mechanisms of the cell type.

One object of the invention is to provide a switch mechanism comprising a circuit breaker, disconnecting switches for the circuit breaker and a dual mechanism for operating the disconnecting switch.

Another object of the invention is to provide a switch mechanism comprising a circuit breaker, disconnecting switches for the circuit breaker, a dual mechanism for operating the disconnecting switches and means for preventing simultaneous operation of the mechanisms.

It is a further object of the invention to provide a switch mechanism comprising a circuit breaker, disconnecting switches for the circuit breaker, a mechanism for operating the disconnecting switches, the said mechanism being adapted either to be motor operated or to be manually operated to and from certain predetermined positions, and means for preventing motor operation of the disconnecting switches so long as they are arranged for manual operation, the said means also being adapted to prevent the manual operation of the disconnecting switches at such times as they are operable by the motor.

These and other objects that may be made apparent throughout the further description of the invention are attained by means of the apparatus hereinafter described, and illustrated in the accompanying drawings, wherein Figure 1 is a diagrammatic view of a switch mechanism embodying the invention, showing the switch connections for normal operation;

Fig. 2 is a view, similar to Fig. 1, showing the switch connections for testing the circuit breaker;

Fig. 3 is a view, similar to Fig. 1, showing the switch connections for testing the feeder circuit;

Fig. 4 is a view, similar to Fig. 1, showing the switch connections for grounding the feeder;

Fig. 5 is a view, similar to Fig. 1, showing the switch connections for grounding the circuit breaker;

Fig. 6 is a side view, in elevation, of a switch mechanism embodying the invention, the cell walls being removed;

Fig. 7 is an enlarged detail view of the disconnecting switch-operating mechanism embodying the invention;

Fig. 8 is an enlarged detail end view of the disconnecting switch-operating mechanism embodying the invention;

Fig. 13 is a sectional view taken along the line XIII—XIII of Fig. 7.

Figure 10:
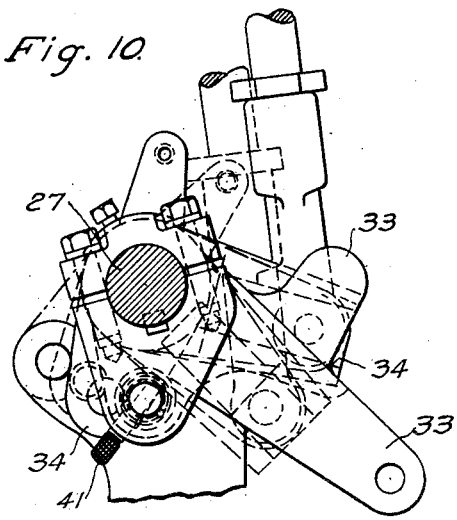
Fig. 10 is a view, similar to Fig. 9, showing the mechanism in a different position.

In practicing the invention, there is provided a cell structure 11 having a front and a rear compartment 12 and 13, respectively, a circuit breaker in a casing 14 and disconnecting switches 15 and 16 disposed in the front compartment, a mechanism 17 disposed in the rear compartment, the disconnecting switch mechanism 17 being adapted for motor or manual operation to and from certain positions and a selector switch 18 disposed in the rear compartment for a use that will hereinafter be described. It will be noted that the circuit breaker is mounted in such manner as to be readily removed for repairs or substitution.

Referring to Figs. 1, 2, 3, 4, 5 and 6, the disconnecting switches 15 and 16 are provided with terminals 19 and 21 for normal operation and terminals 22 and 23 for test operation. Therefore, it will be apparent that the disconnect switches have three positions, namely, normal operation, open and test, the purpose of which will also be hereafter described.

The selector switch 18, disposed in the upper portion of the rear compartment 13, is provided with a test terminal 24 and a ground terminal 25, the switch 18 also having three positions, namely, test, open and ground, the purpose of which is for grounding or testing the various circuits and circuit breaker, as will hereafter be explained.

Referring to Fig. 1, which diagrammatically illustrates the switch mechanism connected for normal operation, the disconnecting switches 15 and 16 are in contact with the respective terminals 19 and 21. Assuming, for the sake of clearness, that the disconnecting switch 16 is adapted for use with the feeder circuit, and the disconnecting switch 15 is adapted for use with the bus bar, it will be apparent from Fig. 1 that the disconnecting switches 15 and 16 are in their closed position for normal operation and that the selector switch 18 is in its open position.

Fig. 2 illustrates the position of the disconnecting switches 15 and 16 and the selector switch 18 for testing the breaker, the disconnecting switch 15 being in contact with the test terminal 22 and the selector switch 18 being in contact with the test terminal 24, thereby connecting the circuit breaker to the test circuit.

Fig. 3 shows the position of the disconnecting switches 15 and 16 and the selector switch 18 for testing the feeder, the disconnecting switch 16 being in contact with the test terminal 23, and the selector switch 18 being in contact with the test terminal 24 for completing the test circuit to the feeder.

Fig. 4 shows the position of the disconnecting switches 15 and 16 and the selector switch 18 for grounding the feeder, the disconnecting switch 16 being in contact with the test terminal 23, and the selector switch 18 being in contact with the ground terminal 25.

Fig. 5 shows the position of the disconnecting switches 15 and 16 and the selector switch 18 for grounding the circuit breaker, the disconnecting switch 15 being in contact with the test terminal 22, the selector switch 18 being in contact with the test terminal 22 and the selector switch 18 being in contact with the ground terminal 25.

The operating mechanism 17 is provided with a motor which can move the disconnecting switches 15 and 16 to and from their open and normal operating positions only.

The mechanism 17 is provided also with a means for manually moving the disconnecting switches to and from their open and test positions only, and interlocks are provided for preventing the motor operation of the disconnecting switches so long as the disconnecting switches are operable manually and vice versa.

Referring to Figs. 6 and 7, the disconnecting switch-operating mechanism 17 comprises a shaft 27 supported at each end by a frame 28 and adapted to be turned to and from one position corresponding to the operative position of the switches 15 and 16 to another position corresponding to the operative position of said switches by a motor mechanism enclosed in a casing 29 and connected to the shaft 27 by an arm 31, rod 32 and casting 33. As shown, the motor mechanism is disposed in a casing to protect its parts and make it readily removable for repairs or substitution. The casting 33 is disposed on the shaft 27 and is keyed thereto. The casting 33 is adapted to cooperate with a casting 34 which is connected to the disconnecting switch 15 by suitable connecting means 35. A casting 36, similar to casting 33, is provided at the right end of the shaft 27 for cooperating with the casting 37, which is similar to casting 34, for operating the disconnecting switch 16. The casting 37 is connected to the disconnecting switch 16 by suitable means 38. The casting 36 is keyed to the shaft 27 in the same manner as the casting 33 and is adapted to operate simultaneously with casting 33. Castings 34 and 37 are disposed on the shaft 27 and adapted to move free of the shaft 27. Suitable interlocks 41 and 42 are provided on the castings 33 and 36, respectively, for interlocking the castings 33 and 36 with the frame 28, when in one position, and, when in another position, for interlocking the castings 33 and 36 with the castings 34 and 37, respectively. Therefore, it may be seen that, when the castings 33 and 36 are interlocked with the frame 28, the castings 34 and 37 are permitted to be manually operated for moving the disconnecting switches to and from their open and test positions. The castings 34 and 37 are provided with cylindrical openings 43 and 44 for inserting a rod or handle for moving the casting from one position to another.

The disconnecting switches 15 and 16 are prevented from being manually moved to their operative positions by the castings 34 and 37, by means of the portions 45 and 46 of castings 33 and 36, respectively, pressing against the castings 34 and 37, thereby preventing movement of the disconnecting switches from their open to their operative positions.

The interlocks 41 and 42 are adapted to interlock the castings 33 and 36 with the frame 28 or the castings 34 and 37, respectively. The interlocks 41 and 42 are operable from one position to the other only when the disconnecting switches are in their open positions. Therefore, it may be seen that, upon releasing the interlocks 41 and 42 from the frame 28, the castings 33 and 36 are interlocked with castings 34 and 37. It follows that, so long as the castings 33 and 36 are interlocked with castings 34 and 37, the disconnecting switches are prevented from moving to and from their test positions and, as the castings 33 and 36 are keyed to the shaft 27, the disconnecting switches are moved to and from their open and closed positions simultaneously.

Figure 9:
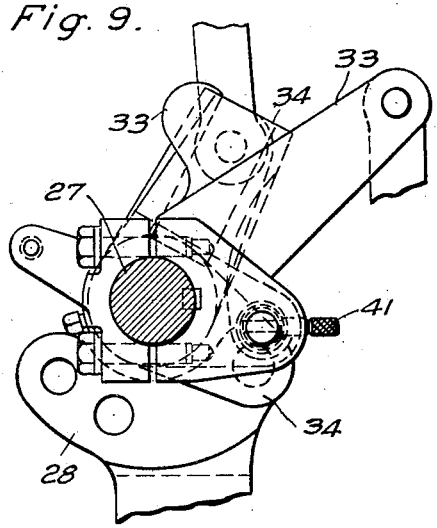
Fig. 9 is a sectional view taken along the line IX—IX of Fig. 7.

The disconnecting switches 15 and 16 are adapted to be independently moved to and from their open to their test positions manually for obtaining the circuits above described, during which time the castings 33 and 36 are interlocked with the frame 28, thereby preventing the operation of the motor mechanism. The castings 34 and 37 are provided with openings 70 that cooperate with openings 71 in the frame 28 for receiving padlocks 72 for interlocking the castings 34 and 37 in their open and test or operating positions, as shown by Figs. 9 and 10.

Figure 12:
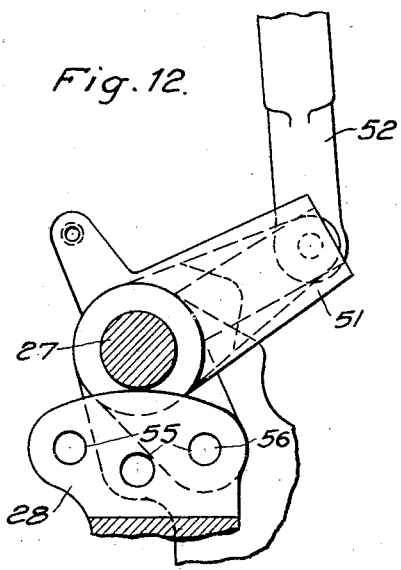
Fig. 12 is a view, similar to Fig. 11, showing the mechanism in a different position.
Figure 11:
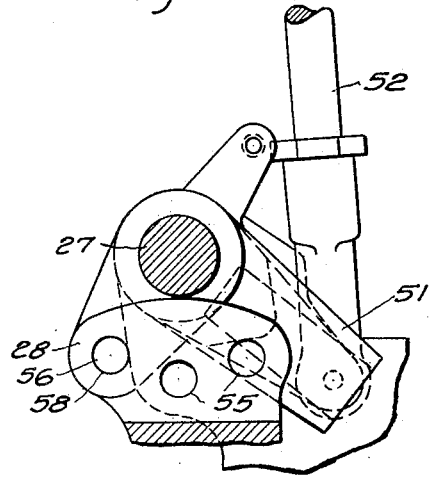
Fig. 11 is a sectional view taken along the line XI—XI of Fig. 7.

A casting 51 is also disposed on the shaft 27 and adapted to move free thereof and is connected to the selector switch 18 by a suitable connection 52. The casting 51 is provided with a cylindrical opening 53 for receiving a handle for manually operating the casting 51 to any desired position. A padlock 54 is provided for locking the casting 51 to the frame 28 in the three positions of the selector switch 18. The casting 51 is further illustrated in Figs. 11 and 12 and shows openings 55 in the frame 28 for cooperating with the opening 56 in the casting 51 for receiving the padlock 54.

There is provided also, on the shaft 27, a casting 57 which is keyed to the shaft 27 and has a portion 58 adapted to cooperate with the circuit-breaker-operating mechanism 59 for preventing the operation of the disconnecting switches 15 and 16 so long as the circuit breaker 14 is in its closed position, and which is also adapted to prevent the closing of the circuit breaker 14 unless the disconnecting switches 15 and 16 are in their full open or full operative position.

The casting 57 is better illustrated in Fig. 13. The circuit-breaker mechanism 59 is shown by the heavy lines in the position occupied when the circuit-breaker is closed and by the dotted lines when the circuit breaker is open. A portion 61 of the circuit-breaker-operating mechanism is adapted to engage the arcuate face 62 of the portion 58 of the casting 57. The casting 57, being keyed to the shaft 27, prevents the shaft 27 from turning so long as the circuit breaker is closed and, upon opening the circuit breaker, the portion 61 of the circuit-breaker-operating mechanism 59 moves to the right to the position indicated by the dotted lines, thereby permitting the turning of the shaft 27 for moving the disconnecting switches to their open positions, at the end of which movement, the portion 58 of the casting 57 will be positioned as indicated by the dotted lines and, upon closing the circuit breaker, the portion 61 of the circuit-breaker-operating mechanism 59 assumes its original position, as first described, when the circuit breaker is closed, engaging the opposite side of the portion 58 of the casting 57, thereby preventing the closing of the disconnecting switches so long as the circuit breaker is in its closed position. It will also be observed that, while the circuit breaker 14 is in its open position, the shaft 27 is permitted to turn and, during such a turning movement, the circuit breaker is prevented from closing by the face 63 of the portion 58 of the casting 57 preventing the portion 61 of the mechanism 59 from reaching its closed position, thereby preventing the closing of the circuit breaker except when the disconnecting switches are in their full open or operative positions.

In the operation of the invention, if it is desired to operate the disconnecting switches by the motor, it is first necessary to see that the interlock 41 is in engagement between the castings 33 and 34, at which time the interlock 41 will be free from contact with the frame 28 and, likewise, to see that the interlock 42 is free from contact with the frame 28 and interlocked with the castings 36 and 37. With the interlocks in the position just indicated, the disconnecting switches are permitted to move from their opening and operative positions by means of the motor and are prevented from moving to their test positions by means of the interlocks 41 and 42, interlocking the castings 33, 34 and 36, 37, respectively.

When it is desired to operate the disconnecting switches manually, it is first necessary to disengage the interlocks 41 and 32 from the castings 34 and 37, respectively, which operation interlocks the castings 33 and 36 with the frame 28, thereby preventing operation of the motor mechanism and rendering the castings 34 and 37 free for manual operation. The disconnecting switches may then be manually operated from their open positions to their test positions independently of each other, as desired, but are prevented from being moved to their normal operating positions by means of the portions 44 and 45 of the castings 33 and 36, respectively, being interlocked with the frame 28, as has been described above.

The embodiment shown is designed for a polyphase circuit having a single-pole circuit breaker and a pair of disconnecting switches for each phase. The circuit breakers of the respective phases are tied together by a mechanical connection 65 which is adapted to open or close all the circuit breakers of a polyphase circuit simultaneously, each circuit breaker being provided with a solenoid 66 which is connected to the mechanical connection 65 by connection 67, the said solenoids all being simultaneously energized from a common electrical source for operating the circuit breakers.

Accordingly, there is provided a switch mechanism comprising a cell structure having a circuit breaker, a plurality of disconnecting switches and a mechanism adapted to operate the disconnecting switches to and from a plurality of positions, the mechanism being adapted for motor operation to certain positions and manual operation to other positions, the whole being provided with means for preventing the operation of the disconnecting switches manually so long as they are arranged for operation by the motor, and means for preventing motor operation of the disconnecting switches so long as they are arranged for manual operation.

While there is illustrated and described but one embodiment of the invention, it will be apparent to those skilled in the art that various changes, modifications, substitutions, additions and omissions may be made in the apparatus illustrated without departing from the spirit and scope of the invention, as set forth in the appended claims.

What is claimed is:

1. A switch mechanism comprising a circuit breaker, disconnecting switches for the circuit breaker, the disconnecting switches having three positions, operative, open and test, a motor-operated mechanism for moving the disconnecting switches to and from their open operative positions, and means for manually operating the disconnecting switches to and from their open positions and their test positions, and means for rendering the motor-operated mechanism inoperative so long as the manually-operated means is operable.

2. A switch mechanism comprising a circuit breaker, disconnecting switches for the circuit breaker, the disconnecting switches having three positions, a motor-operated mechanism for moving the disconnecting switches simultaneously to and from two of the said positions and a manually-operated mechanism for moving the disconnecting switches to and from the other of said positions, and means for rendering the motor-operated mechanism inoperative so long as the manually-operated means is operable.

3. A switch mechanism comprising a circuit breaker, disconnecting switches for the circuit breaker, the disconnecting switches having three positions, operative, open and test, a motor-operated mechanism for moving the disconnecting switches between the open and the operative position, a manually-operated mechanism for independently moving the disconnecting switches between the open and the test position and a mechanical interlock between the motor-operated mechanism and the manually-operated mechanism for rendering the motor-operated mechanism inoperative so long as the manually-operated mechanism is operable.

4. A switch mechanism comprising a circuit breaker, disconnecting switches for the circuit breaker, the disconnecting switches having three positions, operative, open and test, a motor-operated mechanism for moving the disconnecting switches to and from the open to the operative positions, a manually-operated mechanism for moving the disconnecting switches to and from their open to the test positions and means for rendering the manually-operated mechanism inoperative so long as the motor-operated mechanism is operable.

5. A switch mechanism comprising a cell structure having a circuit breaker, disconnecting switches for the circuit breaker, a motor-operated mechanism for the disconnecting switches, a manually-operated mechanism for the disconnecting switches and an interlocking mechanism between the disconnecting switches and the motor-operated mechanism for rendering the manually-operated mechanism inoperable so long as the motor operated mechanism is operable.

6. A switch mechanism comprising a plurality of disconnecting switches, a motor-operated mechanism for simultaneously operating the disconnecting switches, a manually-operable mechanism for independently operating the disconnecting switches and an interlock between the motor mechanism and the manually-operable mechanism for rendering either of the mechanisms inoperable so long as the other mechanism is operable.

7. A switch mechanism comprising a plurality of disconnecting switches having three positions, operative, open and test, a motor-operated mechanism for simultaneously operating the disconnecting switches to and from their open to their closed positions, a manually-operated mechanism for independently moving the disconnecting switches to and from their open to their test positions, and means for preventing the manually-operated mechanism from moving the disconnecting switches to the operative positions.

8. A switch mechanism comprising a cell structure having a plurality of compartments therein, a circuit breaker and a plurality of disconnecting switches disposed in one compartment, and a motor-operated mechanism in another compartment for operating the disconnecting switches to their open or closed position so long as the circuit breaker is in its open position.

9. A switch mechanism comprising a cell structure having a plurality of compartments therein, a circuit breaker and a plurality of disconnecting switches disposed in one compartment, a motor-operated mechanism in another compartment for operating the disconnecting switches to their open or closed positions so long as the circuit breaker is in its open position, and a mechanical connection between the disconnecting switches and the motor-operated mechanism for preventing closing movement of the disconnecting switches so long as the circuit breaker is in its closed position.

10. A switch mechanism comprising a cell structure having a plurality of compartments therein, a circuit breaker disposed in one compartment, a plurality of disconnecting switches disposed in another compartment, a motor-operated mechanism disposed in another compartment for operating the disconnecting switches, and a mechanical interlock between the disconnecting switches and the motor-operated mechanism for predetermining the positions of the disconnecting switches.

11. A switch mechanism comprising a cell structure having a plurality of compartments therein, a circuit breaker disposed in one compartment, a disconnecting switch disposed in another compartment having three positions, a motor-operated mechanism disposed in another compartment for operating the disconnecting switch to and from two of the said positions so long as the circuit breaker is open, means for manually operating the disconnecting switch to its third position, and means for rendering the motor-operated mechanism inoperative so long as the manually-operated means is operable.

12. A switch mechanism comprising a circuit breaker, a plurality of bus bars, a plurality of disconnecting switches for connecting the bus bars to the circuit breaker, a motor-operated mechanism for moving the disconnecting switches to their open or closed position simultaneously so long as the circuit breaker is open, and means for rendering the motor-operated mechanism inoperative unless the disconnecting switches and the circuit breaker are in predetermined positions.

13. A switch mechanism comprising a cell structure, a circuit breaker having terminal members, a plurality of bus bars, disconnecting switches for connecting the bus bars to the said terminal members, a motor-operated mechanism for operating the disconnecting switches simultaneously to and from their open and closed positions, means for preventing the individual operation of the disconnecting switches to and from their open or closed positions, and means for manually operating the disconnecting switches to and from their open or test position, said means having an interlock for preventing the operation of the motor-operated mechanism so long as the disconnecting switches are in their test positions.

14. A switch mechanism comprising a cell structure having a circuit breaker, terminals therefor, a plurality of bus bars, disconnecting switches for connecting the bus bars to the terminals, a motor-operated mechanism for simultaneously operating the disconnecting switches to and from their open or closed positions when the circuit breaker is open, and means for preventing the closing of the circuit breaker unless the disconnecting switches are in their full open or full closed positions.

15. A switch mechanism comprising a cell structure having a plurality of compartments therein, a circuit breaker and disconnecting switches therefor disposed in one of the compartments, and a motor-operated mechanism for the disconnecting switches and a mechanism for causing the motor-operated mechanism to operate the disconnecting switches simultaneously and preventing the individual operation thereof disposed in another of said compartments.

In testimony whereof, I have hereunto subscribed my name this 5th day of April, 1927.

JANE D. BROWN,
*Administratrix of the Estate of James M. Brown, Deceased.*